April 28, 1925.
O. JUNGGREN
1,536,014
PACKING FOR ELASTIC FLUID TURBINES AND THE LIKE
Filed March 23, 1923
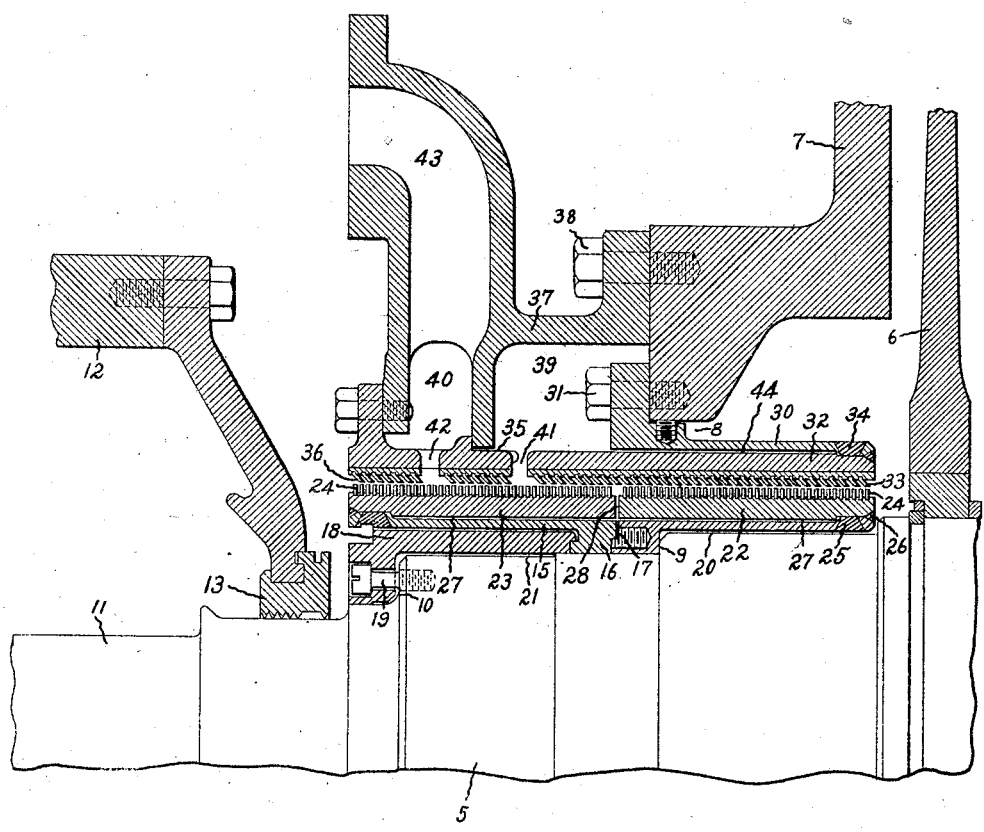
Inventor:
Oscar Junggren,
by
His Attorney.

Patented Apr. 28, 1925.

1,536,014

UNITED STATES PATENT OFFICE.

OSCAR JUNGGREN, OF SCHENECTADY, NEW YORK, ASSIGNOR TO GENERAL ELECTRIC COMPANY, A CORPORATION OF NEW YORK.

PACKING FOR ELASTIC-FLUID TURBINES AND THE LIKE.

Application filed March 23, 1923. Serial No. 627,221.

*To all whom it may concern:*

Be it known that I, OSCAR JUNGGREN, a citizen of the United States, residing at Schenectady, county of Schenectady, State of New York, have invented certain new and useful Improvements in Packings for Elastic-Fluid Turbines and the like, of which the following is a specification.

The present invention relates to packings for preventing leakage between two relatively rotating bodies and especially to packings for elastic fluid turbines.

To still further improve the efficiency of elastic fluid turbines, the use of actuating fluid of higher and higher pressure and super heat is being continuously resorted to and this makes increasingly difficult the problem of providing packings for the machine, particularly for the high pressure end, on account of the high pressures and temperatures involved and the expansion and contraction which takes place when starting up and stopping and also during operation. To reduce leakage to a minimum it is necessary that the packing should have a close clearance and that this clearance be maintained for if the clearance is too great the leakage becomes excessive which detracts from the efficiency of the machine. On the other hand, however, the use of very close clearances increases the likelihood of rubbing occurring, a thing which may result in serious damage to the packing.

The object of my invention is to provide an improved packing structure which is efficient in preventing leakage and which will maintain the desired clearance under all conditions of operation and for a consideration of what I believe to be novel and my invention, attention is directed to the following description and the claims appended thereto.

In the drawing, the figure is a sectional view of a packing embodying my invention, the lower portion of the section being omitted from the figure.

Referring to the drawing, 5 indicates the shaft of an elastic fluid turbine and 6 the first stage wheel suitably fixed on the shaft. The turbine casing or shell is indicated at 7, the part shown being a portion of the end wall, and it is provided with an opening 8 through which the shaft projects and through the annular spaces between the wall of which and the shaft it is desired to prevent leakage of elastic fluid. Shaft 5 is provided with reduced portions which provide annular shoulders 9 and 10 and a portion 11 which is mounted in the usual bearing, (not shown). 12 indicates the bearing housing and 13 a packing to prevent leakage of oil.

The rotating portion of the packing, i. e., the portion carried by the shaft comprises an annular carrying member 15 which surrounds the shaft in spaced relation thereto and is fixed at an intermediate point to the shaft as indicated at 16. As illustrated the carrying member is made in two parts the line of division being indicated at 17 and it is fastened against shoulder 9 by a sleeve 18 fastened to shoulder 10 by a ring of studs 19. This provides annular spaces 20 and 21 between the carrying member and the parts which it surrounds. Fastened to the two ends of carrying member 15 are packing elements 22 and 23 each comprising a cylinder on which are annular packing teeth 24. Cylinders 22 and 23 are fastened to carrying member 15 preferably by welding as indicated at 25 and 26. The welding indicated at 26 is a continuous weld and that indicated at 25 is a ring of welds at spaced points around the shaft, the welding material being put into holes in the carrying member. Cylinders 22 and 23 are of such size that there is an annular space 27 between them and carrying member 15. At their adjacent ends the cylinders are spaced apart as indicated at 28.

The stationary portion of the packing comprises a cylindrical carrying member 30 fixed at one end to turbine casing 7 as indicated at 31. Fastened to the free end of member 30 is an annular packing element 32 which surrounds packing element 22 and the inner end of packing element 23 and is provided with annular packing teeth 33 which pack against packing teeth 24. Preferably packing element 32 is fixed to carrying member 30 by welding after the manner already described in connection with carrying member 15 and cylinders 22 and 23. The welds are indicated at 34. Surrounding the outer end of rotating packing element 23 is a stationary packing element 35 provided with annular packing teeth 36. Packing element 35 is fixed at its outer end to the end wall of a packing housing 37 which is fastened to casing 7 by bolts 38. Housing 37 defines two annular chambers 39 and 40 which surround the packing. The adjacent ends of packing elements 32 and 35 are spaced apart to provide an annular passage 41 which communicates with chamber 39, and in packing element 35 are a number of holes 42 which communicate with chamber 40. Leading from chamber 40 is a conduit 43 for leading away leakage steam. A similar conduit (not shown) is also provided in connection with chamber 39. These conduits may lead to any suitable points. Carrying member 30 is of such diameter that there is an annular space 44 between it and the stationary packing element 32.

With the above-described arrangement, it will be seen that elastic fluid will enter all the annular spaces 20, 27 and 44 and that thus all the packing elements both stationary and rotating are subjected to elastic fluid of substantially the same temperature so that they expand and contract uniformly and together. Also, since the parts are in spaced relation to each other they are free to expand and contract without undue stresses being set up. The arrangement is of particular importance in starting up for at this time the casing is cold and, of course, heats up and expands at a much slower rate than do the packing parts. With a construction embodying my invention, the stationary packing elements can expand independently of the turbine casing or shell. The arrangement is preferably such that the stationary and rotating elements have about the same mass so they will heat up and expand at about the same rate thus maintaining the packing clearance uniform.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:—

1. In a packing structure, the combination with relatively rotating members, of axially extending carrying elements fixed to and arranged in spaced relation to said members, axially extending packing elements carried by and arranged in spaced relation to said carrying elements, and means defining passages for admitting operating fluid to the spaces between the parts.

2. In a packing structure, the combination with a shaft and an adjacent wall, of carrying elements fixed to and arranged in spaced relation to said shaft and wall, packing elements carried by and arranged in spaced relation to said carrying elements, and means defining passages for admitting elastic fluid to the spaces between the parts.

3. In a packing structure, the combination with a shaft and an adjacent wall, of an annular carrying member which surrounds the shaft in spaced relation thereto and is fixed to the shaft by a single connecting means, an annular carrying member fixed to the adjacent wall by a single connecting means, and packing elements carried by said carrying members and in spaced relation thereto.

4. In a packing structure, the combination with a shaft and an adjacent wall, of an annular carrying member which surrounds the shaft in spaced relation thereto, said carrying member being fixed to the shaft at an intermediate point leaving its ends free, annular packing elements fixed to the free ends of the carrying member, and arranged in concentric spaced relation thereto, a packing element which surrounds said first-named packing elements, and yielding means connecting it to said adjacent wall.

5. In a packing structure, the combination with a shaft and an adjacent wall, of an annular carrying member which surrounds the shaft in spaced relation thereto, said carrying member being fixed to the shaft at an intermediate point leaving its ends free, annular packing elements fixed to the free ends of the carrying member and arranged in concentric spaced relation thereto, a packing element which surrounds said first-named packing elements, and an annular carrying member arranged in spaced relation to it and having one end connected thereto, the other end being connected to said adjacent wall.

In witness whereof, I have hereunto set my hand this 22nd day of March, 1923.

OSCAR JUNGGREN.